United States Patent Office 2,881,163
Patented Apr. 7, 1959

2,881,163

PROCESS OF PREPARING SALTS

Otto F. Walasek, Zion, Ill., assignor to Abbott Laboratories, North Chicago, Ill., a corporation of Illinois No Drawing. Application November 16, 1953
Serial No. 392,498

12 Claims. (Cl. 260—210)

The present invention relates to a process of preparing erythromycin salts, and more particularly to an improved process of preparing erythromycin addition salts in a highly purified form.

Erythromycin is an antibiotic obtained by culturing a strain of *Streptomyces erythreus* in a culture medium containing an assimilable source of carbohydrates, nitrogen, and inorganic salts and recovering the erythromycin from the culture medium.

Erythromycin base and its acid addition salts are characterized by a relatively wide bacterial spectrum. They possess antibiotic activity against many microorganisms, both Gram-positive and Gram-negative. A further important antibiotic property of the compounds is their ability to inhibit the growth and development of certain of the Rickettsial bodies and large viruses, for example, epidemic typhus, and meningopneumonitis, and to inhibit effectively the growth and development of some of the spirochetes. The antibiotic properties of the compounds together with their low toxicities make them of great utility as therapeutic agents in the treatment of many diseases.

Certain erythromycin acid addition salts have been found to have marked utility in the preparation of pharmaceutical forms of erythromycin. It is thus highly desirable to be able to produce an erythromycin acid addition salt which has a high initial erythromycin potency and which is relatively stable.

Heretofore the prior art method of preparing erythromycin acid addition salts, such as erythromycin stearate, has been to make the filtered culture broth alkaline to about pH 9 to 11, preferably about pH 9.5, and to extract the adjusted broth with an alkyl acetate, such as amyl acetate. The erythromycin base which dissolves in amyl acetate is then extracted into water the pH of which is adjusted to below about pH 6.5, preferably to about pH 5, and the aqueous extract reduced in volume by evaporation in vacuo to incipient precipitation. The mixture is then made alkaline to about pH 9.5, whereupon erythromycin base separates in solid, usually crystalline form. The base is isolated by filtration or centrifuging and is purified by recrystallization. An aqueous solution of the purified erythromycin base is then treated with an equivalent amount of the desired acid and the solution is evaporated to dryness in vacuo. As an alternate method, an organic solvent solution of the purified erythromycin base can be treated with the desired acid or a solution thereof and the erythromycin salt precipitated directly from solution.

It will be evident that in the prior art methods of preparing erythromycin acid addition salts it has been necessary to isolate the purified erythromycin base and thereafter react a solution of the purified base with the desired acid. Thus, the previous methods of preparing erythromycin acid salts are unsatisfactory from the standpoint of lengthy production and purification procedures, and are also unsatisfactory in view of the low overall recovery of erythromycin activity from the fermentation broth.

It is, therefore, an object of the present invention to provide an improved process of preparing erythromycin acid addition salts.

It is a further object of the present invention to provide a process of preparing erythromycin acid addition salts in a highly purified form.

It is a still further object of the present invention to provide an improved process of preparing erythromycin stearate in a highly purified form.

It is a further object of the present invention to provide a process of preparing erythromycin acid addition salts by a simple and direct procedure that gives a high yield of a highly purified product.

Other objects of the invention will be apparent from the detailed description and claims to follow.

It has been discovered that an improved erythromycin acid addition salt can be prepared directly without isolating the purified erythromycin base by treating an aqueous solution of an erythromycin salt solution obtained from an erythromycin fermentation broth or other source of crude erythromycin with a water-miscible organic solvent in which the erythromycin base is soluble and which contains a suitable concentration of a salting out agent to cause separation of the erythromycin activity into the organic solvent phase, and thereafter reacting the erythromycin in the organic solvent solution with the desired erythromycin salt forming group and recovering the erythromycin addition salt from the reaction mixture.

In one embodiment of the present invention, an aqueous erythromycin salt solution, such as erythromycin acetate or erythromycin sulfate, having a concentration of about 40,000 units erythromycin per ml. at a pH of at least about 8.5 is stirred with at least about 35% by volume of an organic solvent for erythromycin, such as acetone, ethyl alcohol, and isopropyl alcohol, and a highly water soluble inorganic salt as a salting out agent, such as sodium chloride or other highly water soluble salt, said salt being present at a concentration of about 200 grams per liter of the original erythromycin salt solution. The resulting solution is then, either before or after heating, adjusted to a pH of about pH 9 to 11 and heated to a temperature of between about 35° and 45° C. It is preferable to initially adjust the pH of the erythromycin salt solution to about pH 8 to 8.5 and then heat to a temperature of between about 35° and 40° C., add the said organic solvent and salting out agent and finally adjust the pH of the mixture to between pH 9.5 and 10.8. Thereafter to the acetone solution of the erythromycin having a concentration of about 200,000 to 300,000 units erythromycin per ml. at a temperature of about 35–40° C., about 5% to 10% by volume of water at a temperature of 45° C. is added and about 25% excess of the desired acid at a temperature of 40–45° C. is added. The solution is sterile filtered at a temperature of 40–45° C. Thereafter sufficient sterile water at a temperature of 45° C. is added until a slight turbidity is observed but short of causing a distinct phase separation. The solution is then cooled without agitation to a temperature of about 15–20° C., filtered to recover the erythromycin acid addition salt, the said salt washed with 50% acetone at a temperature of 10–15° C., and the salt dried in vacuo at about 45° C.

The following specific examples illustrate the preferred form of the invention and should not be construed to limit the invention to the precise reagents disclosed or proportions employed.

*Example I*

An aqueous solution of unclarified erythromycin acetate salt (298 gallons) having a bio-activity concentration of 39,000 units erythromycin per ml. and a pH of 7.3 is treated with 14 pounds of Hyflo and 5 pounds of Nuchar C-190N. After the mixture has been agitated for 15 minutes the slurried mixture is filtered. The clarified salt solution is then mixed with the following ingredients in the order specified:

Acetone, 120 gallons
10% sodium hydroxide solution to pH 8.2
Sodium chloride, 725 pounds
10% sodium hydroxide solution to pH 10.6

The mixture is then agitated while heating to a temperature of 45° C. and the erythromycin base enriched acetone phase separates from the aqueous salt phase. The acetone phase is recovered and 44 pounds of U.S.P. stearic acid is admixed therewith. After the stearic acid has completely dissolved in the solution, the solution is sterile filtered at 45° C. Thereafter the solution is diluted with an equal volume of water at 45° C. with agitation to give a turbid solution without, however, causing a distinct phase separation. The solution is allowed to crystallize without agitation, cooled for about 12 hours to 18° C., filtered, and after washing the crystals with 50° acetone at 15° C., the crystals are dried in vacuo at 45° C. A yield of 72.5% of erythromycin stearate having a bio-potency of 610 units erythromycin per mg. is obtained based on the etrythromycin activity of the unclarified salt solution.

*Example II*

An aqueous solution of clarified erythromycin acetate (403 gallons) containing 95 billion bio-units of erythromycin at pH 7.0 is mixed with the following ingredients in the order specified:

Acetone, 155 gallons
10% sodium hydroxide solution to pH 8.4
Sodium chloride, 760 pounds
10% sodium hydroxide solution to pH 10.6

The mixture is heated to 45° C. with agitation and the erythromycin base enriched acetone phase separates from the aqueous sodium chloride phase. Thereafter U.S.P. stearic acid (68 pounds) is added to the agitated erythromycin enriched acetone solution at a temperature of 45° C. After the stearic acid is dissolved in the said acetone solution, the solution is sterile filtered and 79 gallons of water at 45° C. is added thereto with agitation causing the solution to become turbid. The solution is allowed to crystallize without agitation and gradually cooled to 18° C. The crystals are filtered, washed with 50% acetone, and dried in vacuo at 45° C. A yield of 69% erythromycin stearate having a bio-potency of 610 units erythromycin per mg. is obtained based on the erythromycin activity of the original clarified erythromycin acetate solution.

*Example III*

An aqueous solution of erythromycin acetate (18.8 liters) having a bio-potency of 40,500 units erythromycin per ml. is obtained from an erythromycin fermentation broth by extracting the said broth at about pH 10 with amyl acetate and then extracting the erythromycin therefrom with water having the pH thereof adjusted to about pH 5 with acetic acid. The said aqueous solution at a pH of 7.3 and a temperature of 38° C. is then agitated with the following ingredients in the order specified:

Acetone, 8 liters
10% sodium hydroxide solution to pH 8.2
Sodium chloride, 5,800 grams
10% sodium hydroxide solution to pH 10.5

The foregoing mixture is agitated for about 15 minutes to insure maximum solubility of the sodium chloride and upon terminating agitation the acetone phase containing erythromycin base separates from the heavier aqueous phase containing the salt components. The acetone phase is found to contain 97.5% of the bio-activity of the original erythromycin acetate solution. An acetone solution of erythromycin base (1,000 ml.) obtained in the above manner is agitated with 75 ml. of water at a temperature of about 42° C. and 84.7 grams of U.S.P. stearic acid. After the stearic acid has completely dissolved in the acetone solution of the erythromycin base, the said solution is diluted with 1,000 ml. of sterile water at a temperature of 48° C. The solution is allowed to crystallize for about 12 hours at a temperature of approximately 5° C. The solution is then filtered and the large needle-like crystals washed with 50% acetone at a temperature of 10° C. and dried in a vacuum at 45° C. A yield of 84% erythromycin stearate having a bio-potency of 617 units erythromycin per mg. and containing 3.2% moisture is obtained based on the erythromycin activity of the acetone solution of the erythromycin base.

*Example IV*

An acetone solution of erythromycin base (1,000 ml.), prepared as described in Example III and having a concentration of 174,250 units erythromycin per ml., is admixed at a temperature of 45° C. with 50 ml. of water and 84.7 grams of U.S.P. stearic acid. The solution of erythromycin stearate in acetone-water is filtered at 45° C. under slight vacuum. The acetone-water solution is then concentrated under vacuum from a volume of 1,150 ml. to a volume of 650 ml. at 45° C. Thereafter 150 ml. of sterile water is added to the concentrated solution while thoroughly agitating the solution at a temperature of 45° C. The turbid solution is then allowed to crystallize by cooling without agitation in a cold room at a temperature of about 5° C. for about 12 hours. The crystal slurry is filtered, the crystals washed with 50% acetone at a temperature of 10° C. and dried in vacuo at a temperature of 45° C. A yield of 78% erythromycin stearate having a bio-potency of 593 units erythromycin per mg. is obtained.

*Example V*

A solution of erythromycin acetate (16 liters) having a bio-activity of 40,200 units erythromycin per ml. at a temperature of 38° C. is extracted with 6,750 ml. acetone by adding 4,300 grams sodium chloride and sufficient 10% sodium hydroxide solution to adjust the pH to about 10.5; whereupon a phase separation is effected with the erythromycin base being concentrated in the acetone phase. An acetone solution of erythromycin base (300 ml.), produced in the above manner, is admixed with 32 grams of U.S.P. stearic acid at a temperature of 45° C. After the stearic acid is completely dissolved, 200 ml. of water at 45° C. is added thereto. The turbid solution is then allowed to crystallize at room temperature for about 12 hours. The crystal slurry is filtered and the crystals washed with 50% acetone at room temperature and dried in vacuo at 45° C. A yield of 92.2% erythromycin stearate having a bio-potency of 590 units erythromycin per mg. is obtained.

*Example VI*

An erythromycin acetate salt solution (2,500 ml.) having a bio-potency of 29,500 units erythromycin per ml. at 35° C. is agitated with the following ingredients in the order listed:

Isopropyl alcohol, 375 ml.
Sodium chloride, 950 grams
10% sodium hydroxide solution to pH 10.5

The mixture is agitated for about 15 minutes at 35° C. and thereafter the mixture separates into an erythromycin enriched isopropyl alcohol phase and an aqueous sodium chloride phase. The said isopropyl alcohol phase containing the erythromycin base is separated from the aqueous phase and 30 grams of stearic acid added thereto. After the stearic acid has completely dissolved in the isopropyl alcohol phase, 270 grams of water at 60° C. is added which causes the solution to become turbid without causing a liquid-liquid phase separation. The turbid solution is cooled to about 2° C. and allowed to stand at the said temperature for about 12 hours to cause substantially complete crystallization of the erythromycin stearate. The erythromycin stearate is recovered by filtration and a yield of 77% of erythromycin stearate is obtained having a bio-potency of 658 units erythromycin per mg.

In the foregoing specific examples illustrating the preferred embodiment of the present invention, the erythromycin acid addition salt is precipitated from the organic solvent solution by the addition of water as this procedure causes the precipitation of said erythromycin salt in a crystal form which has particularly good filtration characteristics. It should be understood, however, that the erythromycin salts can be recovered from the organic solvent solution by various other procedures. For example, the addition of an organic hydrocarbon, such as Skellysolve C, causes the erythromycin salts of the present invention to precipitate from the organic solvent solution. It is also possible to recover the erythromycin salts from the organic solvent solution simply by cooling and allowing sufficient time for the erythromycin salt to precipitate.

While the specific examples illustrating the preferred form of the present invention employ acetone as the organic solvent for the erythromycin addition salts, it is possible to use with equal effectiveness other common water-miscible organic solvents in which the erythromycin salts are soluble including alcoholic solvents such as ethyl alcohol, isopropanol, and tertiary butanol. Other well-known organic solvents can be used in addition to the foregoing solvents as will be evidenced to one skilled in the art. Also, other salting out agents, such as inorganic salts having a relatively high solubility in water can be used in the foregoing process, including calcium chloride and ammonium sulfate. It should also be understood that the pH of the erythromycin solution can be adjusted with potassium hydroxide as well as sodium hydroxide or other well-known alkaline reagents employed to adjust the pH of between about 8.5 and 11, as those skilled in the art can readily determine.

While the erythromycin salt of stearic acid has been the product produced in each of the foregoing specific examples, it should be clearly understood that other erythromycin addition salts are formed, such as erythromycin caproate, erythromycin laurate, erythromycin myristate, erythromycin palmitate, erythromycin oleate, and erythromycin lignocerate, by substituting for stearic acid in the several examples caproic acid, lauric acid, myristate, erythromycin palmitate, etryhtromycin oleate, or other water insoluble saturated or unsaturated fatty acid.

Others may readily adapt the invention for use under vrious conditions of service, by employing one or more of the novel features disclosed or equivalents thereof. As at present advised with respect to the apparent scope of my invention, I desire to claim the following subject matter.

I claim:

1. In a process of recovering erythromycin fatty acid salt relatively free of impurities, the steps comprising: admixing an aqueous solution of a crude erythromycin salt with a water-miscible organic solvent in which the erythromycin is relatively soluble while maintaining the pH at about 8.5 and the temperature between about 35° C. and 45° C., adding an inorganic salt which is relatively soluble in water to cause a separation of the organic solvent solution from the water phase containing the said inorganic salt, adjusting the pH of the said solution to between about pH 9.5 and 11 while maintaining the temperature of the said solution to between about 35° C. and 45° C., whereby the organic solvent solution containing the erythromycin activity separates from the water phase containing the said salt; separating the said organic solvent solution from the said water phase; adding to the said organic solvent phase a compound containing an active fatty acid group which forms an erythromycin fatty acid addition salt; and crystallizing the said erythromycin fatty acid addition salt from the said organic solvent relatively free of impurities.

2. A process substantially as defined in claim 1 wherein the erythromycin acid addition salt is recovered from the organic solvent solution by the step comprising cooling the said solvent solution to below about 20° C., whereby the erythromycin acid addition salt is precipitated from solution relatively free of impurities.

3. A process substantially as described in claim 1 wherein the said organic solvent is acetone.

4. A process substantially as described in claim 1 wherein the said organic solvent is isopropyl alcohol.

5. A process of recovering erythromycin fatty acid salt relatively free of impurities, which comprises: admixing an aqueous solution of a crude erythromycin salt with a water-miscible organic solvent in which erythromycin is relatively soluble, while maintaining the pH at about 8.5 and the temperature between about 35° C. and 45° C. said solvent being present in an amount of at least about 35% by volume of the said aqueous solution, adding an inorganic salt relatively soluble in water at a concentration of at least about 200 grams per liter of the said aqueous solution, adjusting the pH of the said solution to between about pH 9.5 and 11 while maintaining the temperature of the said solution between about 35° C. and 45° C., whereby the organic solvent solution containing the erythromycin base separates from the water phase containing the said salt; separating the said organic solvent solution from the aqueous phase; adding to the said organic solvent solution a water insoluble fatty acid to form an erythromycin fatty acid addition salt; adding to said organic solvent solution containing the said erythromycin acid addition salt sufficient water to cause the said solution to become turbid; and crystallizing the erythromycin fatty acid addition salt which crystallizes therefrom relatively free of impurities.

6. A process substantially as defined in claim 3 wherein the turbid erythromycin-containing organic solvent solution is cooled to between about 15° C. and 20° C. to facilitate crystallization of the erythromycin acid addition salt, and recovering the erythromycin acid addition salt relatively free of impurities.

7. A process of recovering erythromycin fatty acid salt relatively free of impurities, which comprises: admixing an aqueous solution of a crude erythromycin salt having a pH adjusted to about pH 8.5, heating the adjusted aqueous solution to a temperature of between about 35° C. and 45° C., adding a water miscible organic solvent in which the erythromycin is relatively soluble in an amount comprising at least about 35% by volume of the said aqueous solution and an inorganic salt relatively soluble in water in a concentration of at least about 200 grams per liter of the said aqueous solution, adjusting the pH of the mixture to between about pH 10 and 10.8, whereby the said organic solvent solution containing the erythromycin separates from the aqueous phase containing the said inorganic salt; adding to the said organic solvent solution a water insoluble fatty acid to form an erythromycin fatty acid addition salt; adding water to the said organic solvent solution at a temperature of between about 35° C. and 45° C. until the solution becomes turbid; and crystallizing the erythromycin fatty acid addition salt therefrom relatively free of impurities.

8. A process of recovering erythromycin fatty acid salt relatively free of impurities, which comprises: admixing an aqueous erythromycin salt solution with acetone comprising at least about 35% by volume of the said salt solution while maintaining the pH at about 8.5 and the temperature between about 35° C. and 45° C., adding thereto sodium chloride in a concentration of at least about 200 grams per liter of the said salt solution, adjusting the said solution to an alkaline pH of between about pH 9.5 and 11 while maintaining the said solution at a temperature of between about 35° C. and 45° C., whereupon the acetone solution containing erythromycin base separates from the aqueous phase containing the sodium chloride; separating the said acetone solution from the said aqueous phase; adding to the said acetone solution a fatty acid having between 6 and 24 carbon atoms per molecule to form an erythromycin fatty acid addition salt; adding water to the said acetone solution at a temperature of between about 35° C. and 45° C. to cause the acetone solution to become turbid; cooling the said acetone solution to cause precipitation of the erythromycin fatty acid addition salt therefrom; and recovering the erythromycin fatty acid addition salt therefrom relatively free of impurities.

9. A process of recovering erythromycin fatty acid salt relatively free of impurities, which comprises: admixing an aqueous erythromycin salt solution with at least about 35% by volume acetone based on the volume of the said salt solution, adjusting the pH of the said solution to about pH 8.5 by the addition of sodium hydroxide, adding sodium chloride to the said solution in an amount comprising at least about 200 grams per liter of the said salt solution, adjusting the pH of the solution to about pH 10.5 by the addition of sodium hydroxide, and heating the said solution to a temperature between about 35° C. and 45° C. with agitation, whereby the acetone solution containing the erythromycin base separates from the aqueous phase containing the sodium chloride; separating the said acetone solution from the said aqueous phase; adding to the said acetone solution a fatty acid having between 6 and 24 carbon atoms per molecule to form an erythromycin fatty acid addition salt; adding water to the said acetone olution at a temperature of between about 35° C. and 45° C. to cause the acetone solution to become turbid; cooling the said acetone solution to cause precipitation of the erythromycin fatty acid addition salt therefrom; and recovering the erythromycin fatty acid addition salt therefrom relatively free of impurities.

10. A process of recovering erythromycin fatty acid salt relatively free of impurities, which comprises: admixing an aqueous erythromycin acetate solution with acetone comprising at least about 35% by volume based on the said erythromycin acetate solution and sodium chloride in an amount comprising about 220 grams per liter of the said erythromycin solution, adjusting the pH of the said solution to about pH 10.8 by the addition of sodium hydroxide solution, and heating the said solution with agitation to about 35° C., whereupon the solution separates into an erythromycin base-containing acetone phase and a sodium chloride-containing aqueous phase; separating the said acetone phase from the said aqueous phase; adding to the said acetone phase an excess of stearic acid above the molar equivalent amount of erythromycin base in the said acetone solution to form erythromycin stearate; adding water to the said acetone phase at a temperature of about 40° C. to cause the solution to become turbid; cooling the said solution to below about 20° C. to effect substantially complete crystallization of erythromycin stearate from the said solution; and recovering the crystallized erythromycin stearate therefrom relatively free of impurities.

11. A process of recovering erythromycin fatty acid salt from erythromycin fermentation broth relatively free of impurities, which comprises: extracting an erythromycin fermentation broth at about pH 10 with an organic solvent in which the erythromycin is soluble and forming an aqueous erythromycin salt solution therefrom by treating the said solvent containing the eryhtromycin with water which has been adjusted to about pH 5 with a water soluble acid which forms a water soluble erythromycin salt, admixing the said aqueous erythromycin salt solution with a water-miscible organic solvent in which erythromycin is relatively soluble, while maintaining the pH at about 8.5 and the temperature between about 35° C. and 45° C. said solvent being present in an amount of at least about 35% by volume of the said aqueous solution, adding an inorganic salt relatively soluble in water at a concentration of at least about 200 grams per liter of the said aqueous solution, adjusting the pH of the said solution to between about pH 9.5 and 11 while maintaining the temperature of the said solution between about 35° C. and 45° C., whereby the said organic solvent solution containing the erythromycin base separates from the water phase containing the said salt; separating the said organic solvent solution from the aqueous phase; adding to the said organic solvent solution a water insoluble fatty acid to form an erythromycin fatty acid addition salt; adding to said organic solvent solution containing the said erythromycin fatty acid addition salt sufficient water to cause the said solution to become turbid; and recovering the erythromycin fatty acid addition salt which crystallizes therefrom relatively free of impurities.

12. A process of recovering erythromycin fatty acid salt from erythromycin fermentation broth relatively free of impurities, which comprises: extracting an erythromycin fermentation broth at about pH 10 with amyl acetate and forming an aqueous erythromycin acetate solution by extracting the amyl acetate erythromycin solution with water the pH of which has been adjusted to about pH 5 with acetic acid, admixing the said aqueous erythromycin acetate solution at about a pH of at least 8.5 and at a temperature between about 35° C. and 45° C. with acetone comprising at least about 35% by volume of the said acetate solution and adding thereto sodium chloride in a concentration of at least about 200 grams per liter of the said acetate solution, and adjusting the pH to about 9.5 and below pH 11 while maintaining the said solution at a temperature of between about 35° C. and 45° C., whereupon the acetone solution containing erythromycin base separates from the aqueous phase containing the sodium chloride; separating the said acetone solution from the said aqueous phase; adding to the said acetone phase an excess of stearic acid above the molar equivalent amount of erythromycin base in the said acetone solution to form erythromycin stearate; adding water to the said acetone phase at a temperature of about 40° C. to cause the solution to become turbid; cooling the said solution to below about 20° C. to effect subsantially complete crystallization of erythromycin stearate from the said solution; and recovering the crystallized erythromycin stearate therefrom relatively free of impurities.

References Cited in the file of this patent

UNITED STATES PATENTS

| | | |
|---|---|---|
| 2,474,758 | Peck | June 28, 1949 |
| 2,482,055 | Duggar | Sept. 13, 1949 |
| 2,628,186 | Shive | Feb. 10, 1953 |
| 2,631,143 | Braker | Mar. 10, 1953 |
| 2,653,899 | Bunch et al. | Sept. 29, 1953 |

OTHER REFERENCES

Craig: J. Biol. Chem., 1945, pp. 321–332.
De Saint-Rat.: Chem. Abst., 1946. vol. 40, p. 4104.
Craig: J. Biol., 1947, pp. 665–671.
Swart: J.A.C.S., August 1949, pp. 2942–2945.
Swart: J.A.C.S., July 1951, pp. 3253–3255.
Berger et al.: J.A.C.S., vol. 73, No. 11, November 1951, p. 5295.

UNITED STATES PATENT OFFICE
CERTIFICATE OF CORRECTION

Patent No. 2,881,163                                  April 7, 1959

Otto F. Walasek

It is hereby certified that error appears in the printed specification of the above numbered patent requiring correction and that the said Letters Patent should read as corrected below.

Column 5, line 50, strike out "myristate, erythromycin palmitate, etryhtromycin oleate," and insert instead -- myristic acid, palmitic acid, oleic acid, lignoceric acid, --.

Signed and sealed this 1st day of September 1959.

(SEAL)
Attest:

KARL H. AXLINE                                    ROBERT C. WATSON

Attesting Officer                                  Commissioner of Patents